United States Patent [19]
Ohta

[11] Patent Number: 6,108,008
[45] Date of Patent: *Aug. 22, 2000

[54] COLOR IMAGE MAPPING WITHIN OUTPUT DEVICE REPRODUCTION RANGE

[75] Inventor: Takatoshi Ohta, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/529,857

[22] Filed: Sep. 18, 1995

[30] Foreign Application Priority Data

Sep. 22, 1994 [JP] Japan .................................. 6-227789
Sep. 22, 1994 [JP] Japan .................................. 6-227790

[51] Int. Cl.⁷ ............................................. G06T 1/00
[52] U.S. Cl. ........................ 345/431; 345/199; 707/527
[58] Field of Search .................. 395/131; 358/501–518; 345/431, 199; 707/527

[56] References Cited

U.S. PATENT DOCUMENTS

| | | | |
|---|---|---|---|
| H1506 | 12/1995 | Beretta .................................. | 345/199 |
| 4,743,959 | 5/1988 | Frederiksen ............................. | 358/11 |
| 4,958,220 | 9/1990 | Alessi et al. ............................ | 358/76 |
| 5,084,758 | 1/1992 | Danzuka et al. ........................ | 358/296 |
| 5,349,452 | 9/1994 | Maeda et al. ........................... | 358/527 |
| 5,367,387 | 11/1994 | Yamaguchi ............................. | 358/518 |
| 5,371,609 | 12/1994 | Suzuki et al. ........................... | 358/448 |
| 5,432,906 | 7/1995 | Newman et al. ........................ | 395/162 |
| 5,485,284 | 1/1996 | Shono et al. ........................ | 358/518 X |
| 5,539,540 | 7/1996 | Spaulding et al. ...................... | 358/518 |
| 5,546,195 | 8/1996 | Arai ....................................... | 358/518 |
| 5,570,108 | 10/1996 | McLaughlin et al. .................. | 345/146 |

FOREIGN PATENT DOCUMENTS

| | | |
|---|---|---|
| 0203448 | 12/1986 | European Pat. Off. . |
| 0648042 | 4/1995 | European Pat. Off. . |
| 57-056964 | 7/1981 | Japan . |
| 58-080085 | 11/1981 | Japan . |
| 1-229786 | 9/1989 | Japan . |
| WO 9206557 | 4/1992 | WIPO . |
| WO 9430003 | 12/1994 | WIPO . |

OTHER PUBLICATIONS

Lucas, The Analysis, Design and Implementation of Information Systems, 1981, p. 214.

"The Coefficient Rule of von Kries" (J. von Kries: Die Gesichtsempfindungen In. W. Nagel (ed). Handb. physicol, Menschens, vol. 3, Braunschweig: Vieweg, pp. 189–282 (1905)).

*Primary Examiner*—Joseph H. Feild
*Attorney, Agent, or Firm*—Fitzpatrick, Cella, Harper & Scinto

[57] ABSTRACT

An image formed by a predetermined image device is previewed by an image processor. Information of a processing condition of the image forming is entered, and a stored profile according to a processing condition and a type of image forming device is read-out. The profile according to the processing condition corresponds to the information and the type of the predetermined image forming device, and the image processor performs preview processing in accordance with the read-out profile.

12 Claims, 9 Drawing Sheets

COLOR IMAGE MAPPING WITHIN OUTPUT DEVICE REPRODUCTION RANGE

BACKGROUND OF THE INVENTION

1. Field of the Invention

The present invention relates to an image processing apparatus capable of color conversion of color image data to achieve faithful reproduction in an image recording device, and a method therefor.

2. Related Background Art

In case of printing texts, computer graphics or images, prepared by an operator in an application task on host equipment, by a recording device such as an ink jet printer, various methods have been devised for exactly reproducing on the recording device the color desired by the operator.

In certain systems there is employed, for example, a method of setting profile data is employed representing the characteristics of input and output devices, corresponding to the input and output devices of the system and converting the R, G and B values defined in the color space of the input device into the C, M, Y and K values of the color space of the output device by reading thus set profiles of the input and output devices, thereby reproducing the color, desired by the operator on the input device, exactly on the output device, or returning these values to the R, G and B values of the color space of the input device for preview on a monitor.

In such method, however, only one profile can be selected for each input or output device. However, for example, in a binary recording device in which recording is determined by forming or not forming each dot, as in the ink jet recording device, the color reproduction range or the output rendition characteristics may even vary for the same output device, by the binarizing method for the image data containing tonal rendition, such as the dither method or the error diffusion method. Besides such variation in the color reproduction range or the output rendition characteristics may occur even for the same binarizing method on a different recording medium such as coated paper and plain paper. Furthermore, in case of faithfully reproducing the image, displayed on the monitor, in the recording device, even the image on the same monitor may vary by the adjustable values thereof such as the gamma value and the white point. Consequently, even when the input and output devices are fixed, the exact reproduction of the desired color cannot be achieved by a set of profile data if there is a variation in the binarizing method, recording medium or adjustable values.

Also in certain applications, there is conventionally adopted a method of registering in advance colors reproducible on a specified recording device by the mixing ratios of elementary colors, for example C=20%, M=50%, Y=30% and K=0% for a sample color No. 1, and effecting designation of a color by the number of such sample color while referring to the sample colors printed in advance by the specified recording device.

In such method, however, the color samples only contain the C, M, Y and K values while exact colors are not reproduced on the monitor of the host equipment where the operator works.

SUMMARY OF THE INVENTION

In consideration of the foregoing, an object of the present invention is to faithfully reproduce a desired color under the output conditions of predetermined output means.

Another object of the present invention is to precisely judge whether the input image data are within the color reproduction range.

Still another object of the present invention is to enable faithful reproduction, by image recording means, of the color represented by the input color image data dependent on a certain device.

Still another object of the present invention is to enable faithful reproduction, by the image recording device, of the color designated by color designating information.

The foregoing objects can be attained, according to the present invention, by an image processing method comprising steps of:

entering information concerning signal processing condition in predetermined output means; and mapping color image data in a color reproduction range which can be reproduced by said predetermined output means under said entered signal processing condition.

Also the foregoing objects can be attained, according to the present invention, by an image processing method adapted to judge whether input image data are within the color reproduction range of predetermined output means, wherein said judgement is based on the color reproduction range corresponding to the output condition of said predetermined output means.

Furthermore the foregoing objects can be attained, according to the present invention, by an image processing apparatus comprising:

first input means for entering color image data dependent on the characteristics of a predetermined device;

first memory means for storing input profile data representing the characteristics of said predetermined device;

second memory means for storing output profile data representing characteristics under an output condition of predetermined image recording means;

second input means for entering information representing an output condition of said image recording means; and color space conversion means for effecting color space conversion on the color image data entered by said first input means, based on said input profile data and the output profile data corresponding to the output condition of said image recording means, entered by said second input means and stored in said second memory means.

Furthermore the foregoing objects can be attained, according to the present invention, by an image processing apparatus provided with:

input means for entering color designating information;

first memory means for storing color data;

second memory means for storing data representing characteristics of display means; and third memory means for storing characteristics of recording means for recording an image on a recording medium; said apparatus comprising:

read-out means for reading color data corresponding to said color designating information entered by said input means;

color space conversion means for effecting color space conversion on the color data read by said readout means, into color data matching the characteristics of said recording means, based the data in said second memory means representing the display characteristics and the data in said third memory means representing the characteristics of the recording means; and output means for sending the color data, subjected to the color space conversion by said color space conversion means, to said recording means.

Still other objects of the present invention, and the features thereof, will become fully apparent from the following detailed description, which is to be taken in conjunction with the attached drawings.

DETAILED DESCRIPTION OF THE PREFERRED EMBODIMENTS

Now the present invention will be clarified in detail by preferred embodiments thereof, with reference to the attached drawings.

Figure 1:
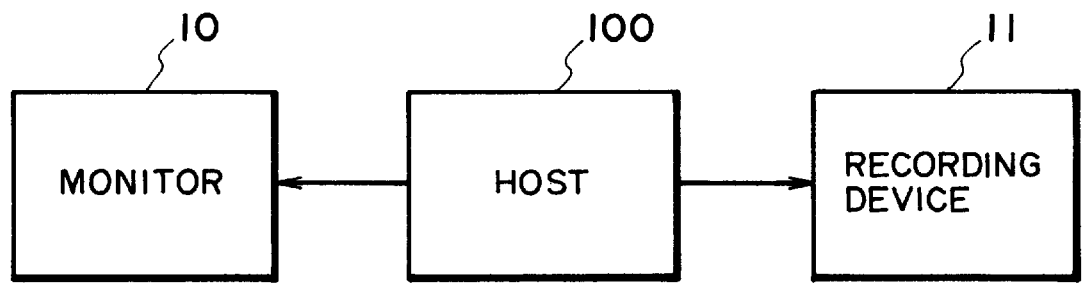
FIG. 1 is a block diagram of a system constituting a first embodiment of the present invention.

FIG. 1 shows an example of the system of the present invention, designed for reproducing an image, prepared by the operator on a host equipment utilizing a displayed image on a monitor 10, by a printer 11 such as an ink jet recording device, and the system is composed of a host equipment 100 and a monitor 10 and a recording device 14 connected thereto.

However the present invention is not limited to the system mentioned above but is likewise realizable in another system provided further with other devices, for example an image input device such as a scanner and an external memory device for storing image data.

Also the connected recording device is not limited to a printer, and can be another device such as a color copying device.

1st embodiment

Figure 2:
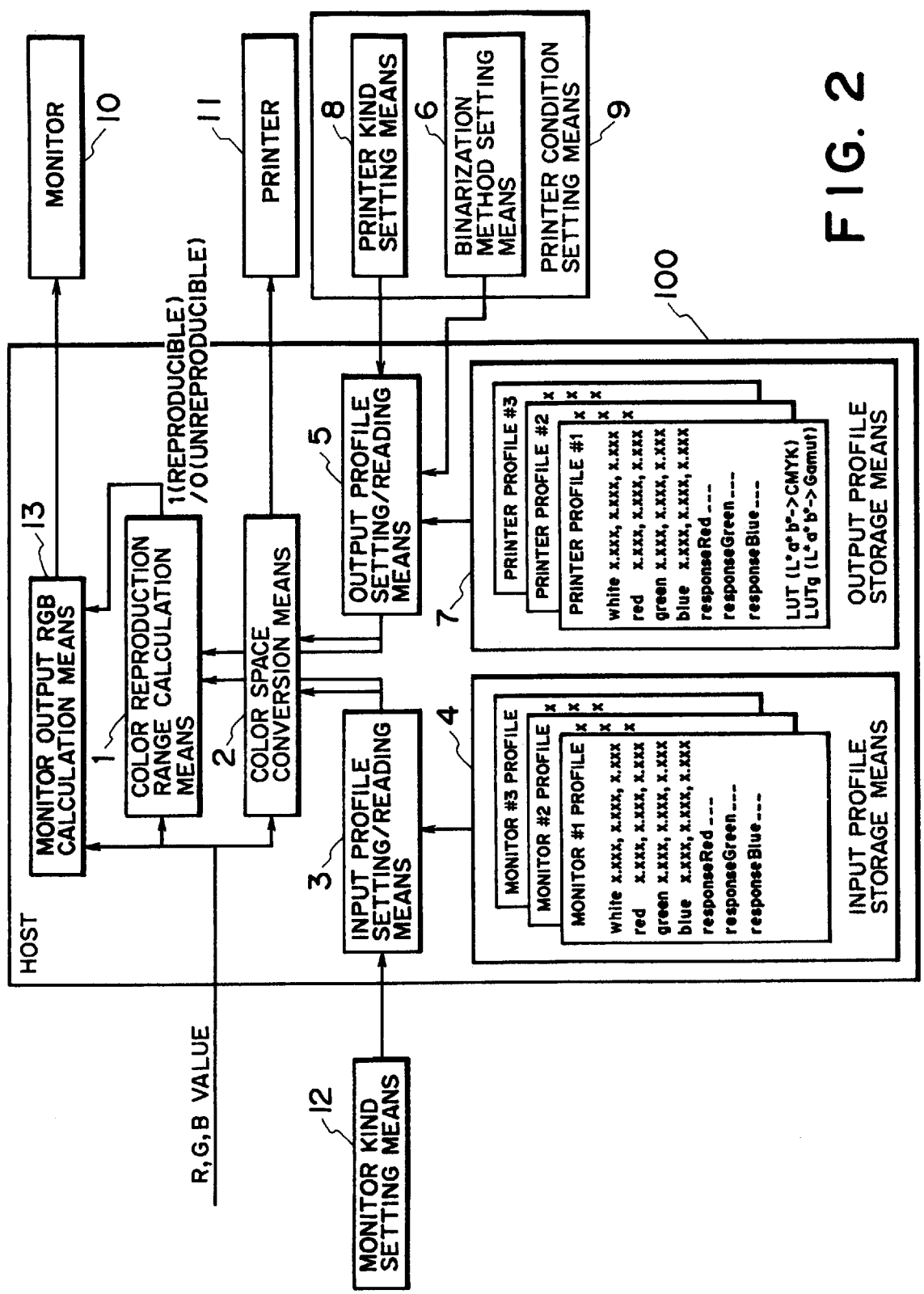
FIG. 2 is a block diagram of an image processing apparatus constituting the 1st embodiment.

FIG. 2 is a block diagram showing an image processing system constituting a 1st embodiment of the present invention.

Color reproduction range calculation means 1 calculates whether the input R, G, B values, dependent on an input device, are reproducible in the output device, utilizing input and output profiles read by input and output profile setting/reading means 3, 5 to be described later.

Color space conversion means 2 effects conversion of the input device-dependent R, G, B values into Y, M, C, K values to be used in and dependent on the printer 11 constituting the output device currently connected to the system, utilizing the input and output profiles read by the input and output profile setting/reading means 3, 5.

Setting means 12 sets the kind of the monitor 10 connected to the host equipment 100 as shown in FIG. 1.

Input profile setting/reading means 3 sets and reads the input profile, according to the kind of monitor set by the monitor setting means.

Input profile memory means 4 stores the input profile representing the device characteristics of the monitor connected to the present system, and the profile data contain color coordinates of a white point and red, green and blue primary colors for defining the monitor-dependent RGB space, and response curves for different colors representing the monitor characteristics.

Printer condition setting means 9 is used to set various output conditions of the connected printer, or the parameters relating to the color process defined therein, and contains printer kind setting means 8 for setting the kind of the connected printer and binarization method setting means 6 for setting the binarizing method to be employed in the printer.

The binarizing method can be, for example the dither method, error diffusion method or density pattern method. The ink jet recording device can reproduce the image only in a binary manner, namely whether or not to deposit ink for each pixel. The binarizing method is employed in order to reproduce the image by the binary data, as close as possible to the original image represented by multi-value data and including intermediate tones. Each binarizing method has its features, and the characteristics of the output device, such as the color reproduction range thereof, naturally vary depending on the binarizing method.

The above-mentioned dither method is disclosed for example in Japanese Patent Application No. 58-80085. Also the error diffusion method and the density pattern method are for example disclosed respectively in Japanese Patent Application No. 1-229786 and No. 57-56964.

In the following features of the dither method and the error diffusion method are described.

The dither method is fast in the processing speed but inferior in tonal rendition, and the color reproduction range is narrow because of such inferior tonal rendition. On the other hand, the error diffusion method is slow in the processing speed but superior in tonal rendition, thus providing a wider color reproduction range.

Thus the dither method and the error diffusion method are different in the color reproduction range.

Output profile setting/reading means 5 sets and reads the output profile, according to the printer condition set by the printer condition setting means 9.

Output profile memory means 7 stores the output profile representing the device characteristics of the recording device connected to the present system, and the profile data content, like the input profile data, the color coordinates of a white point and red, green and blue primay colors, response curves for different colors, a look-up table (LUT) for conversion from L*a*b* values specific to the output profile data to device-dependent C, M, Y, K values, and a LUT for confirming the color reproduction range of the device from the L*a*b* values. These tables contain data for all the combinations of the recording devices and the binarizing methods.

Monitor output RGB calculation means 13 calculates the R, G, B values released to the monitor 10, based on the input R, G, B values dependent on the monitor 10 and the output of the color reproduction range calculation means 1. If the considered R, G, B values are identified by the color reproduction range calculation means 1 as within the color reproduction range of the output device, the R, G, B values are supplied to the monitor 10 without change. On the other hand, if outside the color reproduction range, the R, G, B values are converted to 1, 1, 1 and supplied to the monitor 10 for displaying a white blank area thereon, as an alarm to the operator. In the present invention, such alarm to the operator is not limited to the above-described method but can be given, for example, by a black display area or by an acoustic signal.

Now there will be described, with reference to the flow chart shown in FIG. 3, the conversion executed in the color space conversion means 2 from the R, G, B values in the input device space, dependent on the monitor 10, to the C, M, Y, K values in the output device space. The conversion is executed in the following four processes, based on the parameters of the set printer profile:

(1) RGB→R'G'B'

A 1st step converts the input device-dependent RGB values into corrected values, based on response curves:

R'=response R (R)

G'=response G (G)

B'=response B (B)

wherein response R, response G and response B are functions representing the gamma characteristics of the monitor contained in the input profile, and the values R', G', B' representing the colors displayed on the monitor are obtained by applying these functions to the R, G, B values in the input device space.

This 1st step can achieve precise conversions by simple calculations.

(2) R'G'B'→XYZ

A 2nd step converts the R', G', B' values into values in the XYZ color space as follows:

$$\begin{bmatrix} X \\ Y \\ Z \end{bmatrix} = \begin{bmatrix} Rx & Ry & Rz \\ Gx & Gy & Gz \\ Bx & By & Bz \end{bmatrix}^{-1} \begin{bmatrix} R' \\ G' \\ B' \end{bmatrix}$$

$$\begin{bmatrix} R' \\ G' \\ B' \end{bmatrix} = \begin{bmatrix} Rx & Ry & Rz \\ Gx & Gy & Gz \\ Bx & By & Bz \end{bmatrix} \begin{bmatrix} X \\ Y \\ Z \end{bmatrix}$$

wherein nine parameters Rx, Ry, Rz, Gx, Gy, Gz, Bx, By and Bz are determinable from the color coordinates of red, green and blue phosphors and the color coordinate of the white point of the monitor, contained in the monitor profile, and can be determined, based on these color coordinates $(x_R, y_R, z_R)$, $(x_G, y_G, z_G)$, $(x_B, y_B, z_B)$ and $(x_W, y_W, z_W)$ by solving the following nine simultaneous equations:

$Gx \times x_R + Gy \times y_R + Gz \times z_R = 0$ $Bx \times x_R + By \times y_R + Bz \times z_R = 0$ $Rx \times x_G + Ry \times y_G + Rz \times z_G = 0$ $Bx \times x_G + By \times y_G + Bz \times z_G = 0$ $Rx \times x_B + Ry \times y_B + Rz \times z_B = 0$ $Gx \times x_B + Gy \times y_B + Gz \times z_B = 0$ $Rx \times x_W + Ry \times y_W + Rz \times z_W = 1$ $Gx \times x_W + Gy \times y_W + Gz \times z_W = 1$ $Bx \times x_W + By \times y_W + Bz \times z_W = 1$ The conversion from R', G', B' to XYZ system is conducted by an inverse matrix of a 3×3 matrix having these nine parameters as the components thereof. If the white point in the monitor profile is different from that of the printer profile, there may be conducted white point scaling, for example, according to the coefficient rule of von Kries (J. von Kries: Die Gesichisempfindungen In W. Nagel (ed.). Handb. physiol. Menschens. Vol. 3, Braunschweig: Vieweg, pp.109–282 (1905)).

Such correction of the white point of the monitor according to that of the printer enables precise conversion.

(3) XYZ→L*a*b*

A 3rd step converts the value in the XYZ color space into a value in a uniform L*a*b* color space in the following manner:

If Y/Yw>0.008856, $L^* = 116 \times (Y/Yw)^{1/3} - 16$;

if Y/Yw≦0.008856, $L^* = 903.29 \times (Y/Yw)$ if X/Xw>0.008856,

Y/Yw>0.008856, and

Z/Zw>0.008856, $a^* = 500 \times [(X/Xw)^{1/3} - (Y/Yw)^{1/3}]$ $b^* = 200 \times [(Y/Yw)^{1/3} - (Z/Zw)^{1/3}]$.

In other cases, the foregoing cubic root terms are respectively replaced by:

$7.787 \times (X/Xw) + 16/116$, $7.787 \times (Y/Yw) + 16/116$, $7.787 \times (Z/Zw) + 16/116$ (4) L*a*b*→YMCK A 4th step converts the value in the uniform L*a*b* color space into C, M, Y, K values dependent on the output device, or printer 11 as follows:

$C = LUT_C [L^* \ a^* \ b^*]$ $M = LUT_M [L^* \ a^* \ b^*]$ $Y = LUT_Y [L^* \ a^* \ b^*]$ $K = LUT_K [L^* \ a^* \ b^*]$ wherein $LUT_C$, $LUT_M$, $LUT_Y$ and $LUT_K$ are three-dimensional look-up tables with input of L*a*b* and respective outputs of C, M, Y and K. These tables are prepared in advance by measuring color patches recorded in the recording device based on the C, M, Y, K values reproducible in the binarizing method and placing the C, M, Y, K values of the color patches on the lattice points of the corresponding LUT, based on thus obtained combinations of the L*a*b* values and the C, M, Y, K values.

As each lattice point of the LUT does not necessarily have a measured set of C, M, Y, K values, a closest set of measured values within a predetermined range may be adopted for the lattice point. Though it is desirable to prepare these tables by effecting color measurements for all the combinations of C, M, Y and K, such combinations will require $2^{32} = 4,294,697,296$ color measurements in case each of C, M, Y and K is represented by 8 bits, so that these tables may in practice be prepared by interpolating the results of about 4,096 color measurements.

Also as the color reproduction range of the printer is generally narrower than that of other image output devices such as a monitor printer, a case may result where the input image data are outside the color reproduction range of the recording device so that the lattice point of the above-mentioned LUT lacks the corresponding color measurement data. Consequently the LUT's may be prepared by a color space compression for mapping the input pixel outside the color reproduction range into the color reproduction range of the recording device.

Such mapping can be achieved, for example, for retaining the brightness without change in the hue, by maintaining L* constant and a*/b* ratio constant, and taking C, M, Y, K values within the color reproduction range, farthest from the L* axis, as the values on the lattice point. However the mapping method is not limited to such example.

In this manner the monitor-dependent R, G, B values are converted into the C, M, Y, K values for the recording device, and thus converted C, M, Y, K values are supplied to the recording device currently connected to the system, whereby a color approximately coinciding with the color displayed on the monitor can be recorded by the recording device.

However, if such color space compression is conducted, the color of at least the pixel outside the color reproduction range cannot be faithfully reproduced by the recording device. It is therefore necessary for the operator to recognize the pixels outside the color reproduction range, as informed by the color reproduction range calculation means 1 and to decide whether to effect color space compression before data supply to the recording device or to switch to another recording device showing fewer pixels outside the color reproduction range.

In the following there will be explained, with reference to a flow chart shown in FIG. 4, a method to be executed in the color reproduction range calculation means 2 for determining whether the R, G, B values in the input device space are reproducible by the output device.

Figure 3:
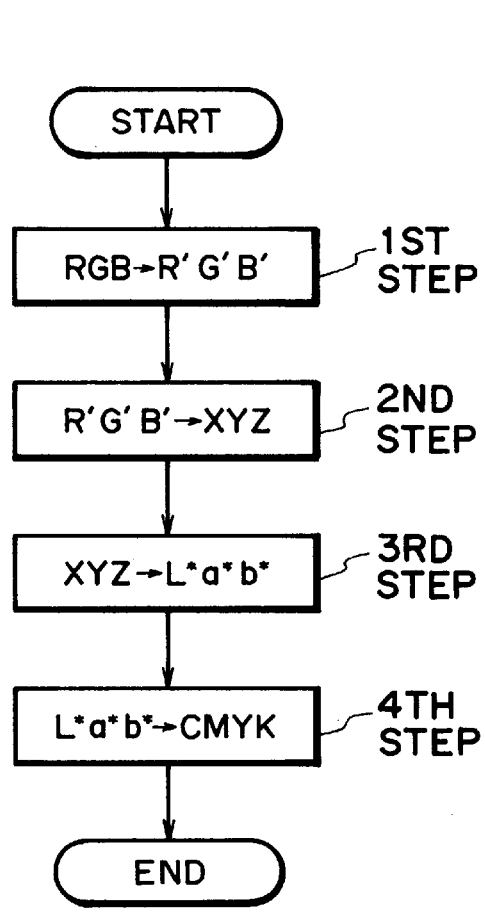
FIG. 3 is a flow chart showing an example of color space conversion process.
Figure 4:
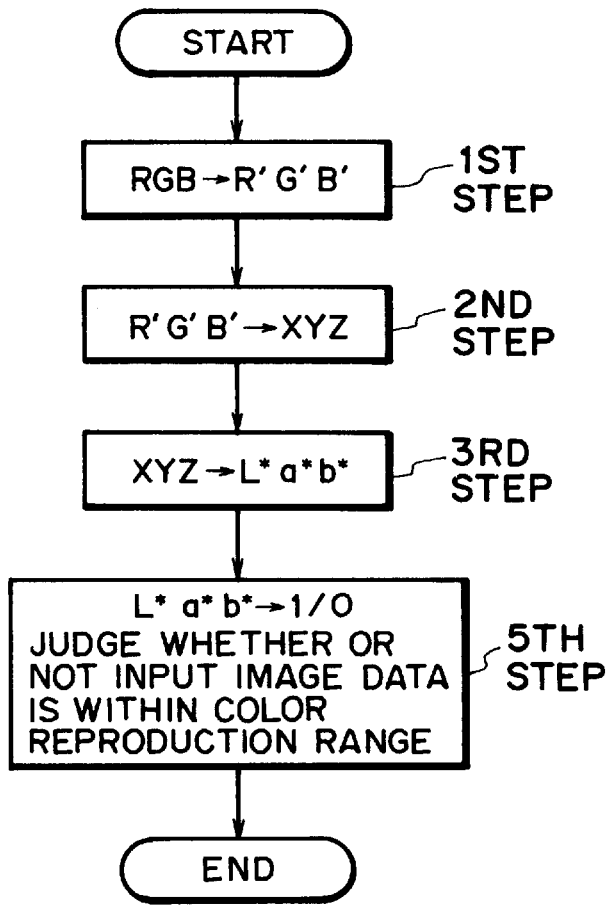
FIG. 4 is a flow chart showing an example of calculation of color reproduction range.

In FIG. 4, steps the same as those in FIG. 3 are represented by the same numbers.

The above-mentioned calculation method is executed through the following four processes, utilizing the parameters in the set printer profile:

(1) RGB→R'G'B'

This conversion is the same as the 1st step executed by the color space conversion means 1.

(2) R'G'B'→XYZ

This conversion is the same as the 2nd step executed by the color space conversion means 1.

(3) XYZ→L*a*b*

This conversion is the same as the 3rd step executed by the color space conversion means 1.

(4) L*a*b*→1/0

A 4th step discriminates whether the input image data are within the color reproduction range of the output device, based on the L*a*b* representing the input image data:

$$1/0 = LUT_g [L*a*b*]$$

wherein $LUT_g$ is a three-dimensional look-up table with the input L*a*b* and an output 1 (reproducible)/0 (not reproducible), and is present in the printer profile set by the output profile setting/reading means 5.

This LUT is prepared by measuring in advance combinations of the C, M, Y, K values reproducible in the recording device according to the binarizing method, and placing 1 or 0, respectively, if a corresponding lattice point of the LUT is present or absent. As in the $LUT_C$, $LUT_M$, $LUT_Y$ and $LUT_K$ used in the 4th step, it is desirable to use the data measured for all the combinations of the C, M, Y, K values, but this table may be formed by interpolating the results of about 4,096 color measurements. Thus it can be calculated whether the monitor-dependent R', G', B' values are reproducible by the recording device currently connected to the system, and the result is supplied to the monitor output RGB calculation means 13 whereby the pixel positions within the color reproduction range can be displayed on the monitor.

Also, as the output profile or the printer profile is set according to the kind of the printer and the binarizing method adopted therein, the color processing can be achieved based on the parameters faithful to the characteristics of the output device.

Embodiment 1-2

Figure 5:
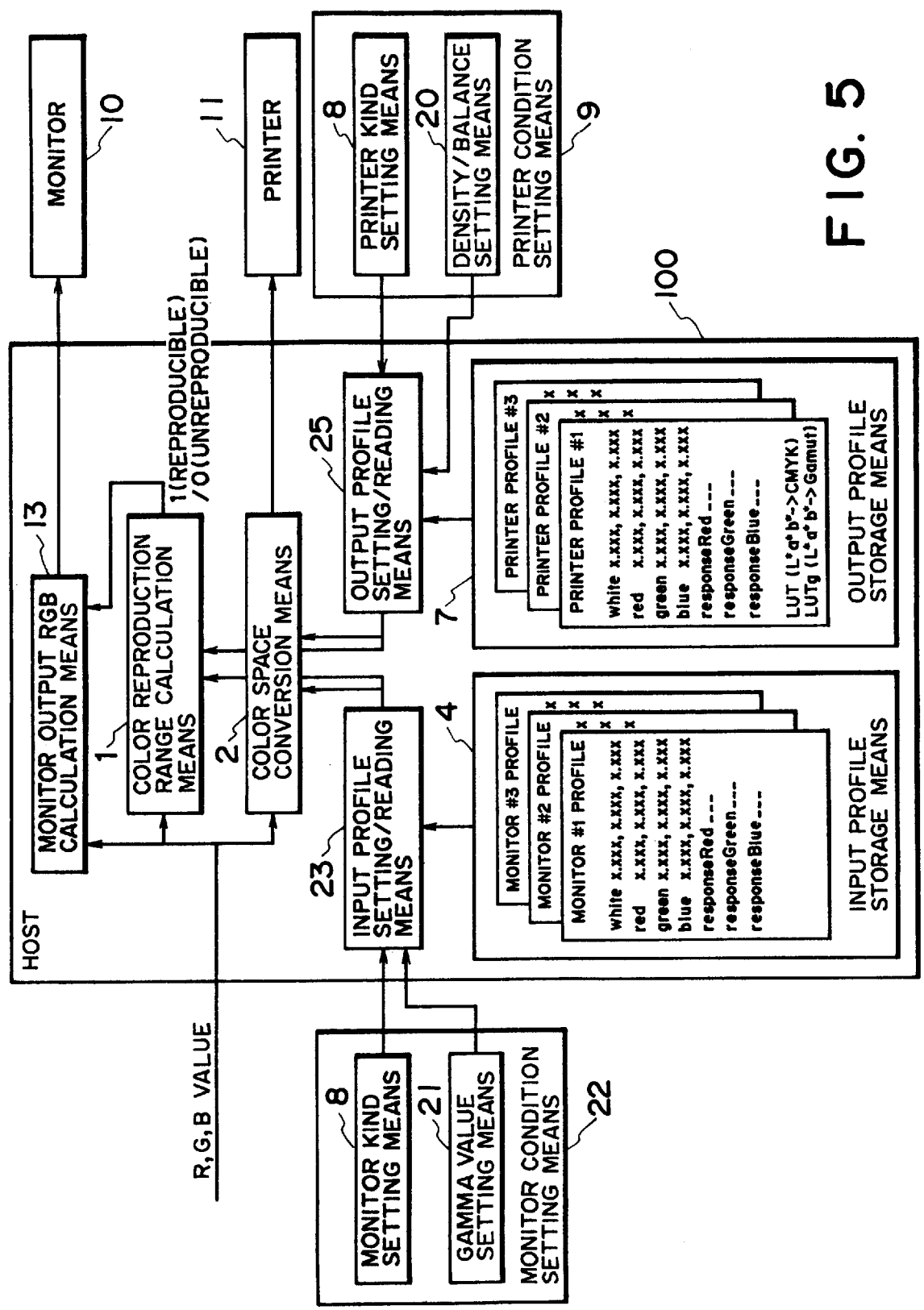
FIG. 5 is a block diagram of a variation 1 of the image processing apparatus of the 1st embodiment.

FIG. 5 is a block diagram showing an image processing apparatus constituting a variation 1 of the 1st embodiment, wherein components the same as those in FIG. 2 are represented by the same symbols and will not be further described.

In the present embodiment, different from the configuration of the 1st embodiment, gamma value setting means 21 for setting the gamma value of the monitor is connected to the input profile setting/reading/varying means 23 whereby a monitor profile 12 is set corresponding to each monitor. Also density/balance setting 20 for setting the density of the output image and the balance of C, M, Y and K inks is connected to the output profile setting/reading/varying means 25, whereby a printer profile 14 is set for each recording device. Such configuration allows varying the response curve of the profile data according to the gamma value of the currently set monitor and also according to the current set density and balance thereof. Thus, according to the present embodiment, the color formed on the printer can be made to exactly coincide with the color on the monitor, based on the gamma value of the monitor condition and the density/balance value of the printer condition.

Embodiment 1-3

Figure 6:
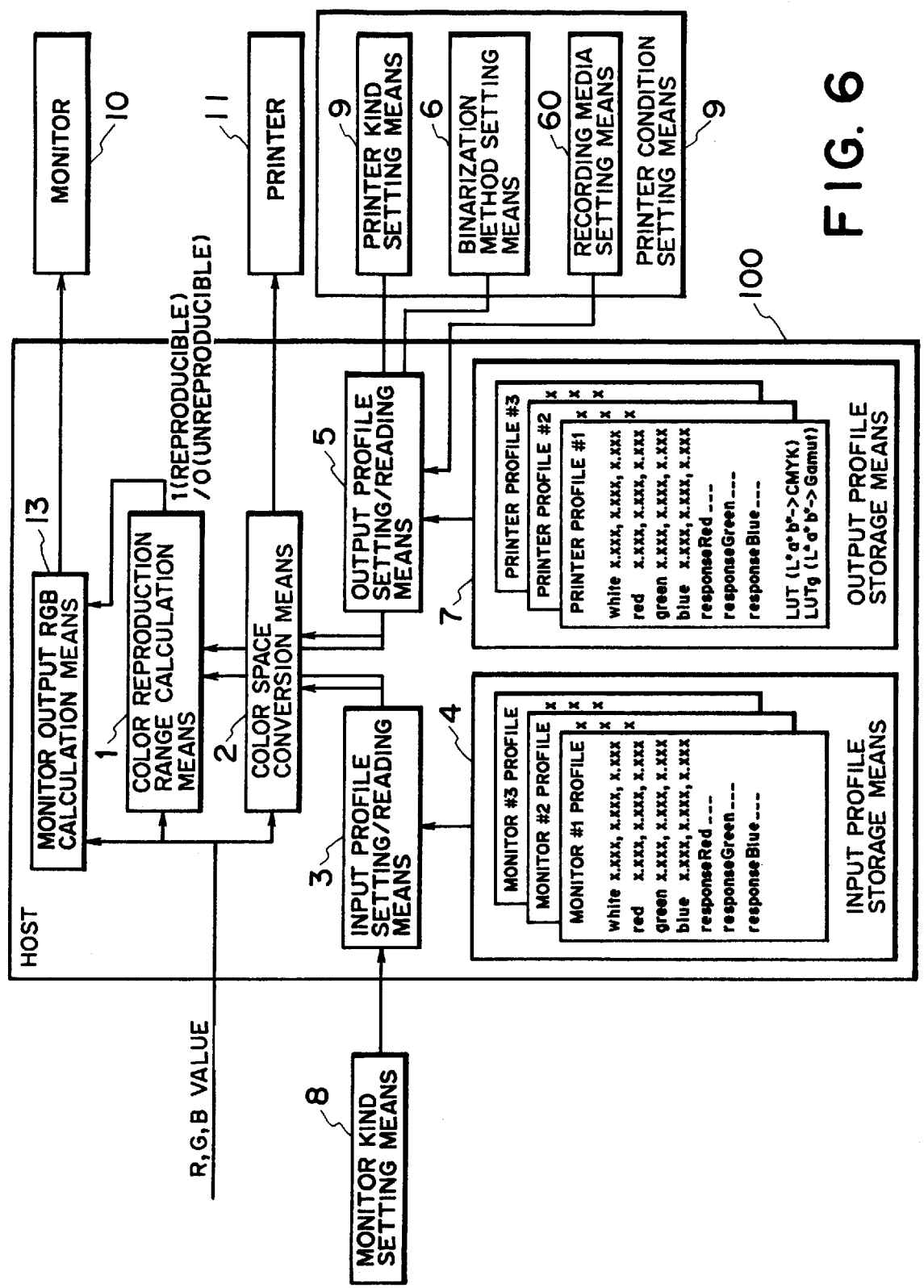
FIG. 6 is a block diagram of a variation 2 of the image processing apparatus of the 1st embodiment.

FIG. 6 is a block diagram showing an image processing apparatus constituting a variation 2 of the 1st embodiment, wherein components the same as those in FIG. 2 are represented by the same symbols and will not be further described.

In the present embodiment, in addition to the configuration of the 1st embodiment, recording medium setting means 60 is connected to the output profile setting/reading means. Such configuration allows selecting appropriate profile data in consideration not only of the binarizing method in the recording device but also of the difference in the color reproduction range resulting from the difference in the recording medium, whereby the color formed in the printer can be made to more exactly coincide with the color on the monitor.

The recording medium is the material on which the image is recorded by the recording device, and can be, for example, coated paper, plain paper, OHP sheet, BPF sheet or lustre paper. The features of these recording media will be briefly described in the following.

The coated paper, BPF sheet and lustre paper have a wide color reproduction range, and the plain paper and BJ cloth have a narrow range. The OHP sheet has a wide range as the colors are represented by transmissive light.

In this manner, the color reproduction range varies depending on the recording medium.

Embodiment 1-4

Figure 7:
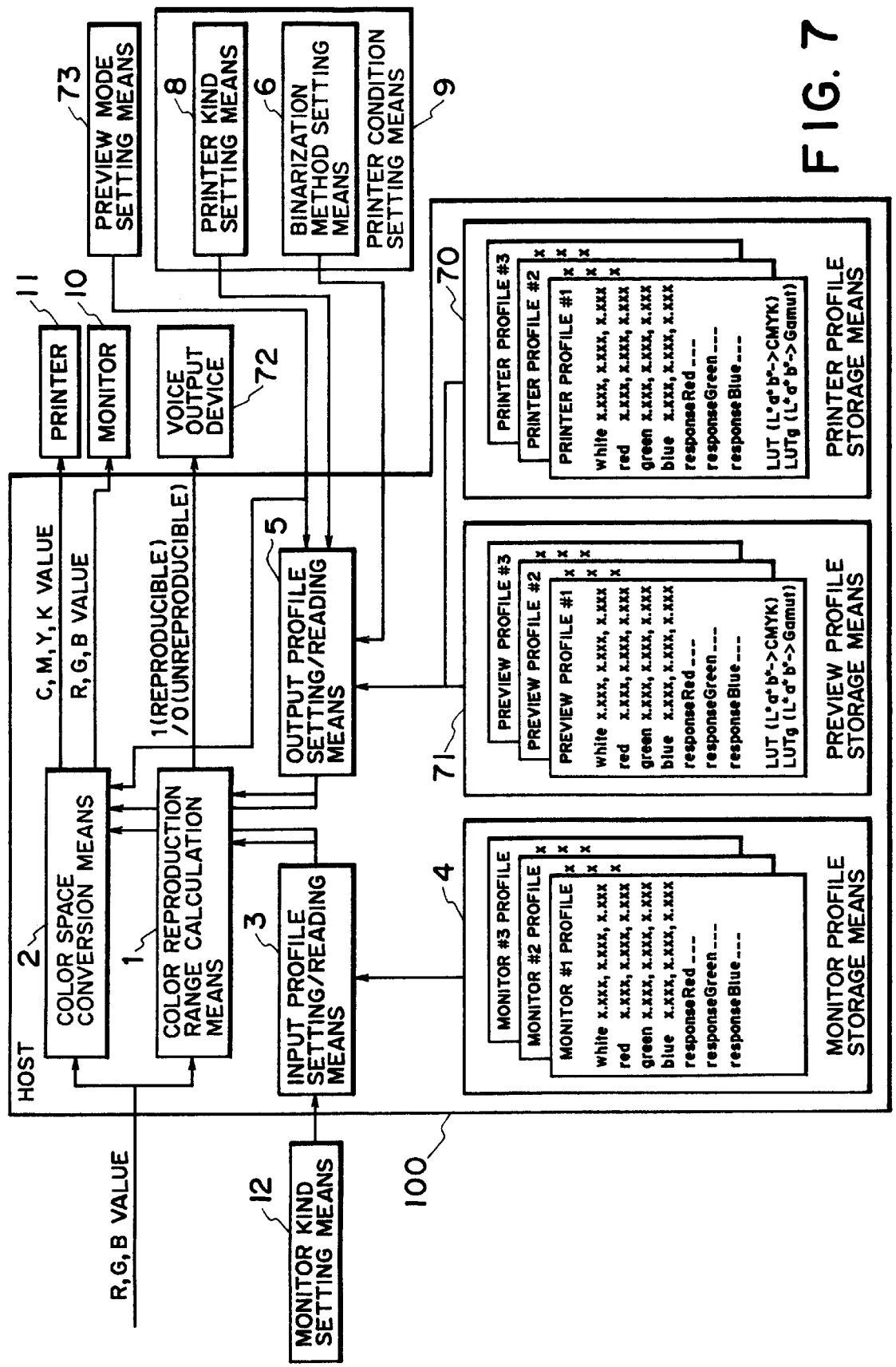
FIG. 7 is a block diagram of a variation 3 of the image processing apparatus of the 1st embodiment.

FIG. 7 is a block diagram showing an image processing apparatus constituting a variation 3 of the 1st embodiment, wherein components the same as those in FIG. 2 are represented by the same symbols and will not be further described.

In the present embodiment, in addition to the output profile memory means 7 of the 1st embodiment, a preview profile memory means 71 is provided for storing profile data for preview. Such preview profile allows, when a preview mode is turned on, to preview, on the monitor, the color based on the image data subjected to color space compression, namely the color actually obtained on the recording device from the image data not reproducible thereon. It is thus rendered possible to confirm the result of the color space compression. Different from the output profile data, the preview profile data contains a look-up table for color space compression from L*a*b* values to L*a*b* values, instead of the look-up table for conversion from the L*a*b* values to the device-dependent C, M, Y, K values. Thus the R, G, B values entered into the color space conversion means 2 are converted, by the steps (1) to (3) described in the 1st embodiment, into L*a*b* values, then further converted in the step (4) into L*'a*'b*' values, and are subjected to inverse conversions of the steps (1) to (3) to the R, G, B values, which are used for display on the monitor. Such configuration allows to display, on the monitor in advance, the difference in the color reproduction range or in the output tonal characteristics resulting from the difference in the binarizing method.

Thus, in an image processing system in which the profile data representing the characteristics of the input/output devices are set corresponding to the input/output devices used in the system, and the R, G, B values defined in the color space of the input device are converted into the C, M, Y, K values of the color space of the output device by reading thus set input/output profiles, whereby the color desired by the operator on the input device is exactly reproduced on the output device or the C, M, Y, K values are reconverted to the R, G, B values in the color space of the input device for previewing on the monitor, it is rendered possible to exactly reproduce the desired color and to achieve previewing on the monitor even in the presence of variation in the binarizing method, recording medium and various set values.

Embodiment 1-5

Figure 8:
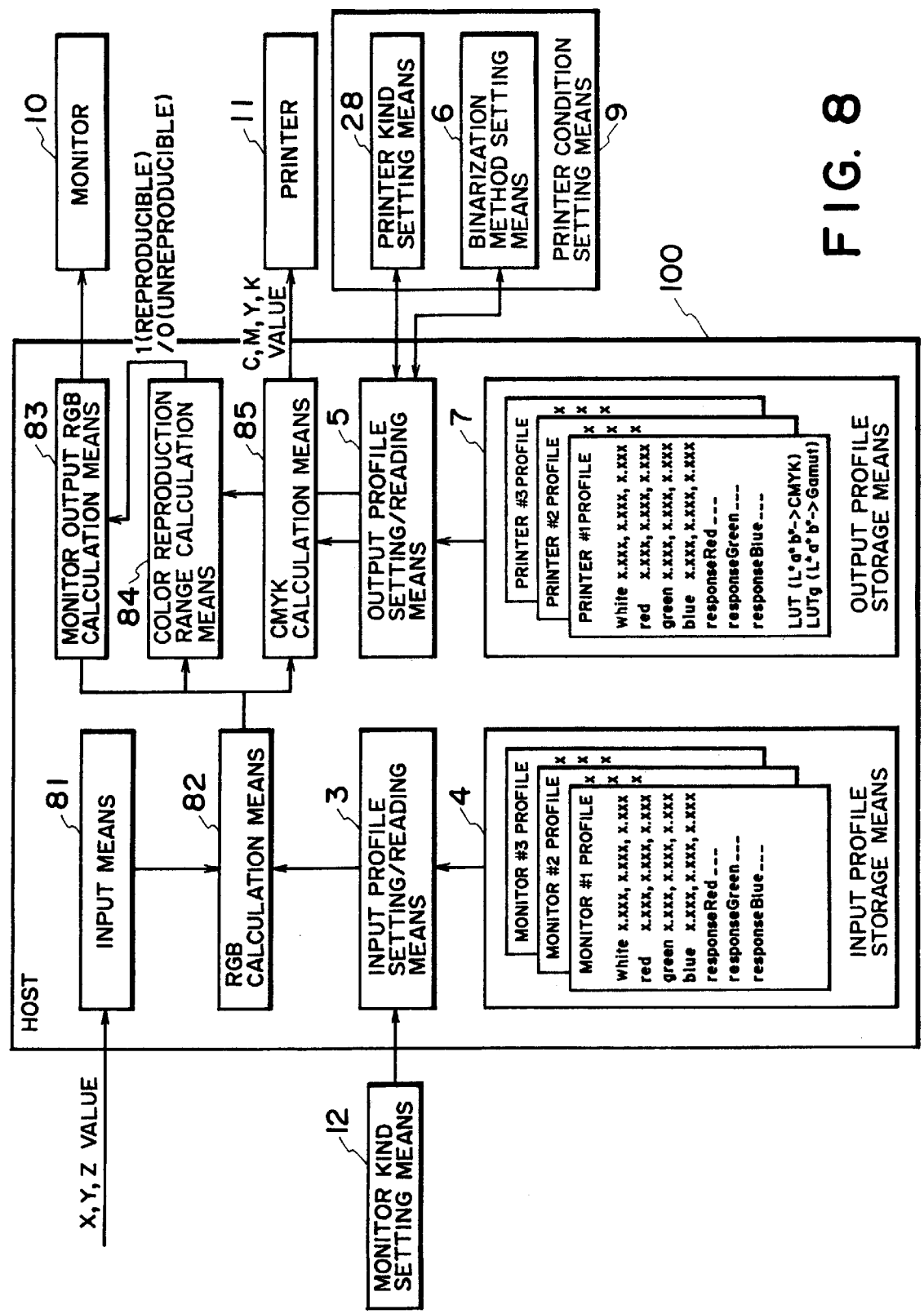
FIG. 8 is a block diagram of a variation 4 of the image processing apparatus of the 1st embodiment.

FIG. 8 is a block diagram showing an image processing apparatus constituting a variation 4 of the 1st embodiment, wherein components the same as those in FIG. 2 are represented by the same symbols and will not be further described.

In the 1st embodiment, the R, G, B image data entered in the host equipment are dependent on the monitor.

In the image processing apparatus of the present embodiment, the input image data are XYZ values not dependent on the device.

Input means 81 enters XYZ values, independent of the device, from an external equipment. RGB calculation means 82 converts the XYZ values, entered by the input means and not dependent on the device, into RGB values dependent on the monitor 10, based on the input profile representing the characteristics of the monitor 10.

The present embodiment is featured by the conversion of the input XYZ values, not dependent on the device, into the monitor-dependent RGB values.

Such conversion into the image data of desired characteristics constituting a reference in the image processing apparatus, based on the input profile representing the characteristics of the input image data entered by the input means, allows the color of the input image data to be faithfully reproduced on the monitor and on the printer.

Thus, in an image processing system in which plural sets of profile data corresponding to various settings of the input and output devices are set, and which is provided with input/output profile setting/reading means for reading out a profile according to the kind of devices, settings thereof and setting of the process mode, and color space conversion means capable of varying the processing method according to various settings or the process mode, thereby converting the color values defined in the color space of the input device into those of the color space of the output device, it is rendered possible to exactly reproduce the color even in the presence of variations in various settings.

In the foregoing 1st embodiment, the gamma value is set for the input device, and the binarizing method, recording medium, preview mode, density and color balance are set for the output device, and other setting conditions may naturally be added to the profile data.

Also the 1st embodiment employs a binarization process, however the present invention is not limited to such case and is applicable to any digitization process to n values, wherein n is a natural number smaller than the number m of levels of the input R, G, B values.

2nd embodiment

The foregoing 1st embodiment described a system for faithfully reproducing, on a printer, an image prepared by an application task on host equipment.

The 2nd embodiment describes a system for preparing an image by an application task, utilizing color samples.

The present 2nd embodiment is also applicable, like the foregoing variations, to the 1st embodiment.

Figure 9:
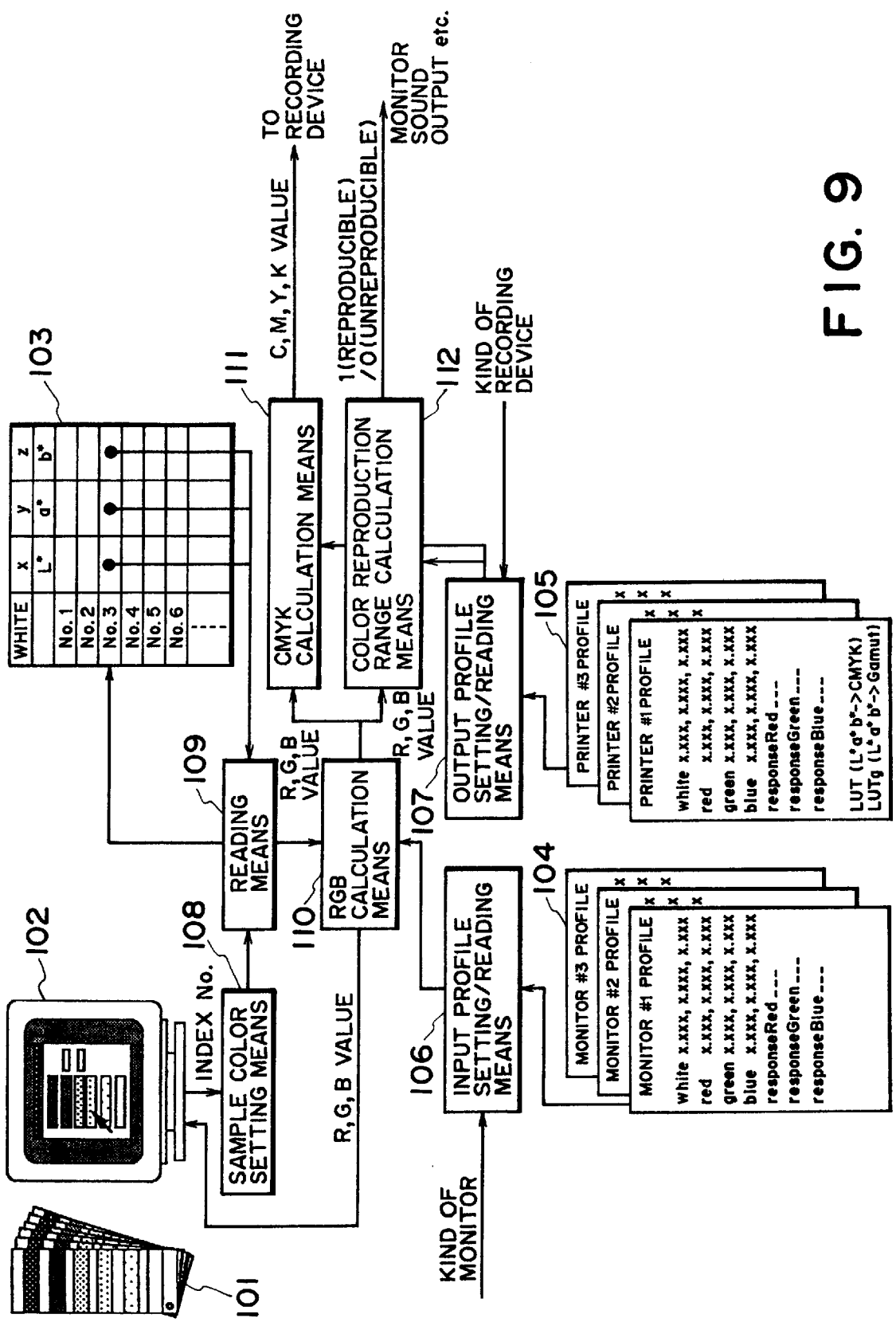
FIG. 9 is a block diagram of an image processing apparatus constituting a 2nd embodiment of the present invention.

FIG. 9 is a block diagram showing an image processing system constituting a 2nd embodiment of the present invention.

A color sample book 101 consists of color samples prepared in advance by a recording device (not shown) connected to the system or an ordinary printing press, and is utilized a reference by the operator, in determining the color to be released by the recording device connected to the system. A monitor 102 displays color samples in a similar manner as the color sample book 101, whereby the operator can set the color to be formed in the recording device in interactive manner. Recording means 103 records the color coordinates of each color sample, registered in the color sample book 101, in the CIE La*b* space in association with an index number, for all the colors contained in the color sample book 101. Though the color coordinates of each sample color are recorded, in the present embodiment, in the CIE La*b* space, but such recording may be made in any device-independent color space such as CIE XYZ space or CIE Lu*v* space. In any color space other than the CIE XYZ space, there are also required the color coordinates, in the CIE XYZ space, of the white point in the color space, so that such coordinates are also recorded.

There are also provided input profile memory means 104 for storing monitor profile data, representing the device characteristics of a monitor connected to the present system, and output profile memory means 105 for storing profile data, representing the device characteristics of a recording device connected to said system. Each of these profile data contains the color coordinates of the white point and red, green and blue primary colors, and the response curves for these colors.

Also the printer profile contains a look-up table (LUT) for conversion from the L*a*b* values, not dependent on the device, to the device-dependent C, M, Y, K values and a LUT for confirming the color reproduction range of the device from the L*a*b* values.

Consequently the RGB data, dependent on the device characteristics of the monitor, can be converted into the monitor-independent data, based on the data corresponding to the monitor in the monitor profile. Also the L*a*b* data, independent of the device and obtained from the color sample book, can be converted into the monitor-dependent RGB data, based on the data of the above-mentioned monitor profile. Consequently the image on the monitor can be displayed with a faithful color.

Similarly, in case of data supply to the recording device, the device-independent image data can be converted into the recording device-dependent C, M, Y, K data, based on the data in the printer profile corresponding to the recording device. Thus a faithful color can be reproduced on the recording device.

Input profile setting means 106 and output profile setting means 107, for respectively setting a monitor profile and a printer profile, are adapted to select profile data, matching the monitor and the printer currently connected to the system, from plural sets of profile data stored in the above-mentioned memory means, according to the information supplied to the setting means and indicating the kind of the monitor and the recording device. Sample color setting means 108 sets, with an index number, a color selected by the operator from the sample colors on the monitor. Reading means 109, for reading, from recording means 103, the color coordinate values corresponding to the sample color set by the sample color setting means 108, reads the color coordinate values of the sample color from the recording means 103, according to the corresponding index number released from the sample color setting means 108. Calculation means 110, for calculating the R, G, B values to be displayed on the monitor, effects the calculation from the set monitor profile and the color coordinates of the sample color read by the reading means 109, based on the information indicating the kind of monitor, from the input profile setting means 106. The conversion from the color coordinates L*a*b* of the sample color to the monitor-dependent R', G', B' values is executed in the following three steps:

(1) L*a*b*→XYZ

A 1st step converts the L*a*b* color space into XYZ space according to the following equations:

$$X=Xw \times g((L^*+16)/116+a^*/500)$$

$$Y=Yw \times g((L^*+16)/116)$$

$$Z=Zw \times g((L^*+16)/116-b^*/200)$$

wherein Xw, Yw, Zw are color coordinates of the white point used in the measurement of the sample color, and function g(x) is:

$g(x)=x^3$ for $x \geq 6/29$;

$g(x)=(108/841) \times (x-(4/29))$ for $x < 6/29$.

(2) XYZ→RGB

A 2nd step converts the XYZ color space into RGB space based on the color coordinates of R, G, B phosphors of the monitor and of the white point, according to the following equations:

$$R = Rx \times X + Ry \times Y + Rz \times Z$$

$$G = Gx \times X + Gy \times Y + Gz \times Z$$

$$B = Bx \times X + By \times Y + Bz \times Z$$

wherein nine parameters Rx, Ry, Rz, Gx, Gy, Gz, Bx, By and Bz are determinable from the color coordinates of red, green and blue phosphors and the color coordinates of the white point of the monitor, contained in the monitor profile, and can be determined, based on these color coordinates $(x_R, y_R, z_R)$, $(x_G, y_G, z_G)$, $(x_B, y_B, z_B)$ and $(x_W, y_W, z_W)$, by solving the following nine simultaneous equations:

$$Gx \times x_R + Gy \times y_R + Gz \times z_R = 0$$

$$Bx \times x_R + By \times y_R + Bz \times z_R = 0$$

$$Rx \times x_G + Ry \times y_G + Rz \times z_G = 0$$

$$Bx \times x_G + By \times y_G + Bz \times z_G = 0$$

$$Rx \times x_B + Ry \times y_B + Rz \times z_B = 0$$

$$Gx \times x_B + Gy \times y_B + Gz \times z_B = 0$$

$$Rx \times x_W + Ry \times y_W + Rz \times z_W = 1$$

$$Gx \times x_W + Gy \times y_W + Gz \times z_W = 1$$

$$Bx \times x_W + By \times y_W + Bz \times z_W = 1$$

(3) RGB→R'G'B'

A 3rd step corrects the RGB values, obtained in the 2nd steps, according to response curves in the following manner:

$R'=$response $R^{-1}(R)$ $G'=$response $G^{-1}(G)$ $B'=$response $B^{-1}(B)$ wherein response R, response G and response B are functions representing the gamma characteristics of the monitor contained in the monitor profile. For faithful reproduction of the colors, the inverse functions of these functions are applied to the R, G, B values determined in the step (2) to obtain monitor-dependent R'G'B' values, or the RGB values to be displayed on the monitor.

In this manner the conversion from the color coordinates L*a*b* of the sample color to the monitor-dependent R'G'B' values is executed. If the white point used in the measurement of the sample color recorded by the three recording means is different from the white point of the monitor in the monitor profile, white point scaling may be conducted, for example, according to the coefficient rule of von Kries (J. von Kries: Die Gesichtsempfindungen In W. Nagel (ed.), Handb. Physiol. Menschens, Vol. 3, Braunschweig: Vieweg, pp. 109–282 (1905)).

The R', G', B' values calculated by the calculation means 110 are supplied to the monitor, whereby a color the same as the sample color in the color sample book 101 is displayed on the monitor 102.

Even when the monitor connected to the system is changed, a monitor profile corresponding to the kind of the thus changed monitor can be set by the input profile setting means 106, so that plural monitors can be handled with a simple configuration.

CMYK calculation means 111 calculates the C, M, Y, K values dependent on the recording device to be used among those currently connected to the system, utilizing the monitor-dependent R, G, B values calculated by the calculation means 110 and the printer profile set by the output profile setting means 107 according to the information indicating the kind of the recording device. The conversion from the monitor-dependent R', G', B' values to the recording device-dependent C, M, Y, K values is executed in the following four steps:

(1) R'G'B'→RGB

A 1st step is an inverse conversion of the step (3) of the RGB calculation means 110.

(2) RGB→XYZ

This is also an inverse conversion of the step (2) of the RGB calculation means 110. Also in this case, if the white point in the monitor profile is different from that in the printer profile, a correction may be made for example according to the coefficient rule of von kries.

(3) XYZ→L*a*b*

This is also an inverse conversion of the step (1) of the RGB calculation means 110, conducted in the following manner:

if Y/Yw>0.008856,
  $L^* = 116 \times (Y/Yw)^{1/3} - 16$;
if Y/Yw≦0.008856,
  $L^* = 903.29 \times (Y/Yw)$
if X/Xw>0.008856,
  Y/Yw>0.008856, and
  Z/Zw>0.008856,
    $a^* = 500 \times [(X/Xw)^{1/3} - (Y/Yw)^{1/3}]$
    $b^* = 200 \times [(Y/Yw)^{1/3} - (Z/Zw)^{1/3}]$.

In other cases, the foregoing cubic root terms are respectively replaced by:
  $7.787 \times (X/Xw) + 16/116$,
  $7.787 \times (Y/Yw) + 16/116$,
  $7.787 \times (Z/Zw) + 16/116$,
(4) L*a*b*→CMYK
  $C = LUT_C [L^*, a^*, b^*]$
  $M = LUT_M [L^*, a^*, b^*]$
  $Y = LUT_Y [L^*, a^*, b^*]$
  $K = LUT_K [L^*, a^*, b^*]$
wherein $LUT_C$, $LUT_M$, $LUT_Y$ and $LUT_K$ are three-dimensional look-up tables with input of L*a*b* and respective outputs of C, M, Y, K dependent on the recording device. These tables are prepared in advance by measuring colors recorded in the combinations of C, M, Y, K values reproducible by the recording device, and placing the C, M, Y, K values of the colors on the lattice points of the corresponding LUT. As each lattice point of the LUT does not necessarily have a measured set of C, M, Y, K values, a closest set of measured values within a predetermined range may be adopted for the lattice point. Though it is desirable to prepare these tables by effecting color measurements for all the combinations of C, M, Y and K, such combinations will require $2^{32}$=4,294,697,296 color measurements in case each of C, M, Y and K is represented by 8 bits, so that these tables may in practice be prepared by interpolating the results of about 4,096 color measurements. In case any lattice point of the LUT lacks the corresponding data of color measurement, namely if the color coordinates of the lattice point is outside the color reproduction range of the recording device, suitable C, M, Y, K values may be assigned by a suitable mapping. Such mapping can be achieved, for example, for retaining the brightness without change in the hue, by maintaining L* constant and the a*/b* ratio constant, and taking C, M, Y, K values within the color reproduction range, farthest from the L* axis, as the values on the lattice point. However the mapping method is not limited to such example.

In this manner the monitor-dependent R', G', B' values are converted into the recording device-dependent C, M, Y, K values, which are supplied to the recording device currently connected to the system. It is thus rendered possible to record, by the recording device, a color the same as or closest within the reproducible range to the sample color set on the monitor 102 by the operator with reference to the color sample book 101.

As in the case of the monitor, the output profile setting means 107 can vary the printer profile according to the kind of the printer, so that any recording device connected to the system can be easily handled.

Color reproduction range calculation means 112 calculates whether the set sample color is reproducible by the recording device currently connected to the system, based on the R, G, B values calculated by the calculation means 110 and the printer profile set by the output profile setting means 107. The calculation is executed in the following four steps:

(1) R'G'B'→RGB
This step is the same as the step (1) of the CMYK calculation means 111.

(2) RGB→XYZ
This step is also the same as the step (2) of the CMYK calculation means 111. If the white point in the monitor profile is different from that in the printer profile, a correction may be conducted, for example, according to the coefficient rule of von Kries.

(3) XYZ→L*a*b*
This step is the same as the step (3) of the CMYK calculation means 111:
if Y/Yw>0.008856,
  $L^* = 116 \times (Y/Yw)^{1/3} - 16$;
if Y/Yw≦0.008856,
  $L^* = 903.29 \times (Y/Yw)$
if X/Xw>0.008856,
  Y/Yw>0.008856, and
  Z/Zw>0.008856,
    $a^* = 500 \times [(X/Xw)^{1/3} - (Y/Yw)^{1/3}]$
    $b^* = 200 \times [(Y/Yw)^{1/3} - (Z/Zw)^{1/3}]$.

In other cases, the foregoing cubic root terms are respectively replaced by:
  $7.787 \times (X/Xw) + 16/116$,
  $7.787 \times (Y/Yw) + 16/116$,
  $7.787 \times (Z/Zw) + 16/116$
(4) L*a*b*→1/0
  $C = LUT_g [L^*, a^*, b^*]$
wherein $LUT_g$ is a three-dimensional look-up table with the input of L*a*b* and an output 1 (reproducible)/0 (not reproducible), and is prepared by measuring in advance combinations of the C, M, Y, K values reproducible in the recording device and placing 1 or 0 respectively if a corresponding lattice point of the LUT is present or absent. As in the case of $LUT_C$, $LUT_M$, $LUT_Y$ and $LUT_K$, it is desirable to use the data measured for all the combinations of the C, M, Y, K values, but this table may be formed by interpolating the results of about 4,096 color measurements.

Thus, whether the monitor-dependent R', G', B' values are reproducible by the recording device currently connected to the system can be calculated, and the result is supplied to the monitor 101 for display thereon or acoustic output means (not shown) for generating an alarm sound to the operator.

Embodiment 2-21

Figure 10:
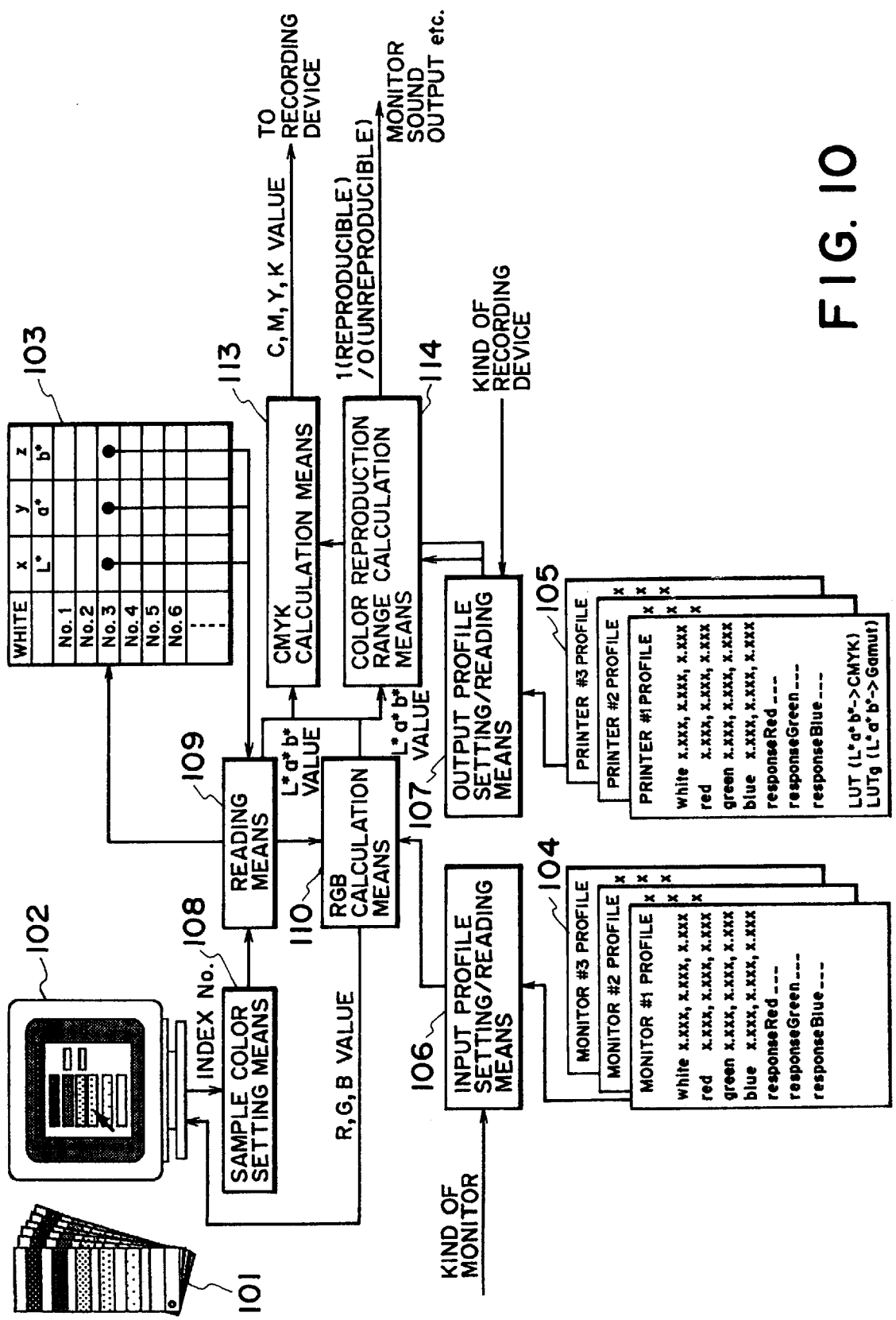
FIG. 10 is a block diagram of a variation 1 of the image processing apparatus of the 2nd embodiment.

FIG. 10 is a block diagram showing an image processing apparatus constituting a variation 1 of the 2nd embodiment, wherein components the same as those in FIG. 9 are represented by the same symbols and will not be further described.

In the present embodiment, the CMYK calculation means 113 and the color reproduction range calculation means 114 effect calculation of the C, M, Y, K values to be used in the recording device currently connected to the system and calculation whether the color is reproducible by the recording device currently connected to the system, utilizing the L*, a*, b* values released from the reading means 109 and the printer profile set by the output profile setting means 107. In the present embodiment, the direct calculation with the L*, a*, b* values released from the reading means 109 allows to dispense with a series of conversions of R'G'B'→RGB→XYZ→L*a*b* as in the 1st embodiment, thereby achieving a better efficiency in the system.

Embodiment 2-3

Figure 11:
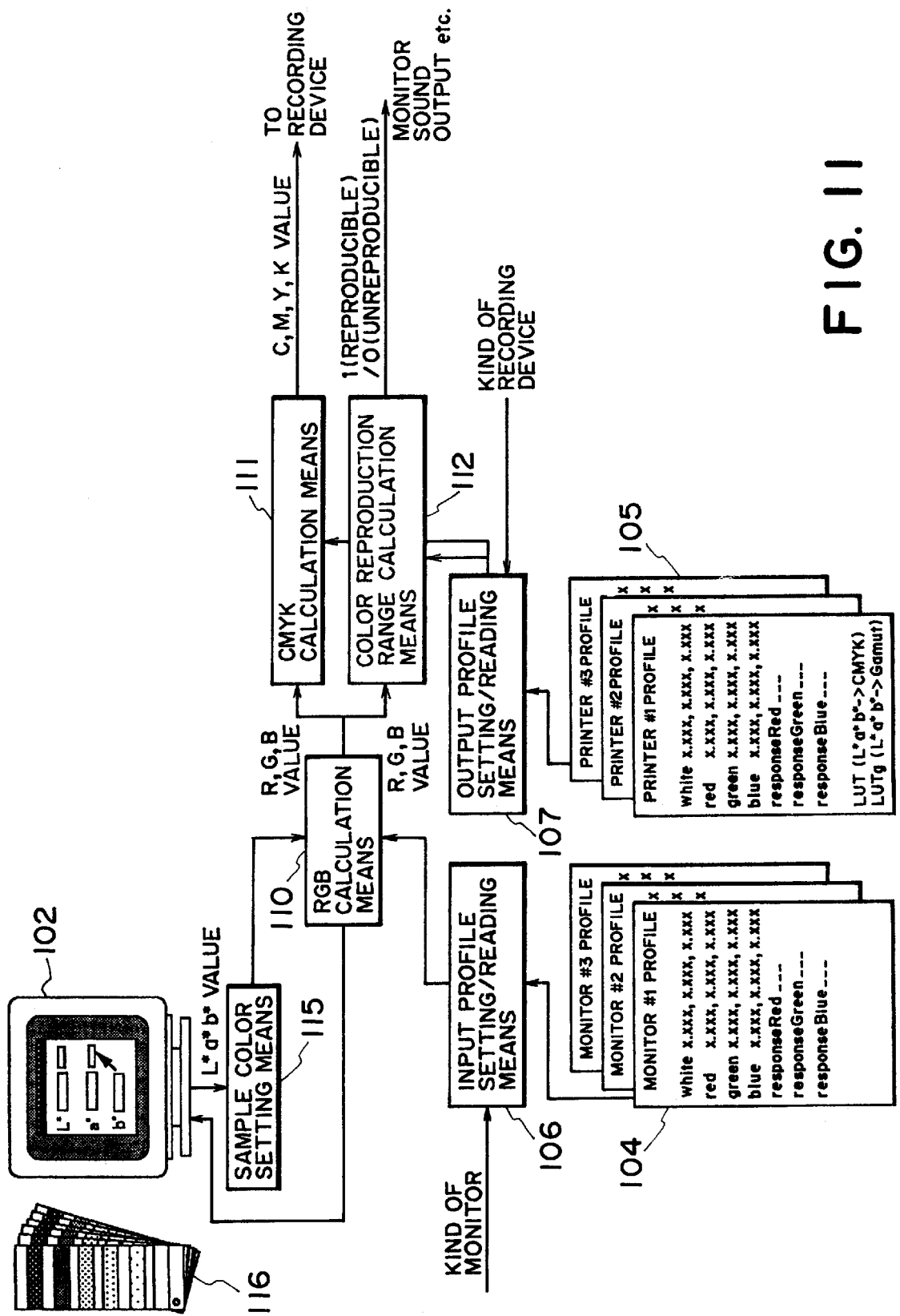
FIG. 11 is a block diagram of a variation 2 of the image processing apparatus of the 2nd embodiment.

FIG. 11 is a block diagram of an image processing apparatus constituting a variation 2 of the 2nd embodiment of the present invention, wherein components the same as those in FIG. 9 are represented by the same symbols and will not be further decribed.

In the present embodiment, the operator sets, by the monitor 102, the color coordinates of a desired color in the device-independent color space, instead of the index number in the color sample book. The color sample book 116 contains sample colors and color coordinate values thereof, and the operator directly enters the coordinate values by the sample color setting means 115. Such configuration allows to dispense with the recording means 103 and the reading means 109, thereby achieving a simpler system.

As described in the foregoing, in a system in which color designation is conducted with a color sample book allowing to predict the colors reproducible by the recording device, the 2nd embodiment of he present invention enables to reproduce the exact color not only on the monitor but also on the recording device, and to check, in advance, whether the designated color is within the color reproduction range of the recording device.

The foregoing embodiments utilize the CIE La*b* space as the device-independent color space, but there may employed the CIE XYZ space or CIE Lu*v* space as long as a device-independent description is possible. Also in the foregoing embodiments, the four colors of C, M, Y and K are assumed for supply to the recording device, but a similar configuration is naturally possible with the three colors of R, G and B or C, M and Y or with a larger number of colors.

Also the recording device employed in the present invention is not limited to the one described in the foregoing, but there may be employed a recording device provided with a recording head for discharging liquid droplets by film boiling with thermal energy and employing a recording method utilizing such recording head.

The present invention is furthermore applicable to a case in which the present invention is realized by the supply of a program to a system or an apparatus. In such case a recording medium storing the program of the present invention constitutes the present invention. The program is used to control the process of the various means, and the system or the apparatus functions in a predetermined manner by the supply of the program from the memory medium to the system or the apparatus.

The present invention is not limited to the foregoing embodiments and is subject to various modifications within the scope and spirit of the appended claims.

What is claimed is:

1. An image processing method comprising the steps of:
   entering information of a type of a predetermined image forming means and a type of quantization processing method for image formation;
   reading out, from a storing means which stores plural profiles, a one of the profiles corresponding to the information of the type of the predetermined image forming means and the type of quantization processing method;
   when a preview mode, in which image data for previewing an image formed by a predetermined image forming means is generated, is set, performing preview processing by using the profile read out in said reading-out step; and
   when an image forming mode is set, performing color matching by using the profile read out in said reading-out step,
   wherein the profiles each include a preview processing condition and a color matching condition which respectively correspond to information of a type of image forming means and a type of quantization processing method.

2. A method according to claim 1, wherein the quantization processing method is a binarizing method.

3. A method according to claim 1, wherein the preview processing includes color processing according to the predetermined image forming means.

4. A method according to claim 1, further comprising a step of executing quantization processing on the image data to which the color matching is performed, according to the type of quantization processing method corresponding to the read out profile.

5. A method according to claim 1, further comprising a step of converting the generated image data into RGB data based on the characteristic of a monitor to which said RGB data is to be output.

6. An image processing method, comprising the steps of:
   entering information on a processing condition and an output device type;
   reading out a profile in accordance with the processing condition and the output device type from a storing means which stores a plurality of profiles each including gamut data and a color matching condition according to a processing condition and an output device type;
   judging whether or not input color image data is within a gamut according to the entered processing condition and the entered output device type, on the basis of the gamut data included in the profile; and
   notifying a user when the input color image data is outside the gamut.

7. A method according to claim 6, wherein the processing condition is related to quantization processing.

8. A method according to claim 6, wherein the processing condition is related to a recording medium.

9. An image processing apparatus comprising:
   entering means for entering information of a type of a predetermined image forming means and a type of quantization processing method for image formation;
   reading means for reading out, from storing means which stores plural profiles, a one of the profiles corresponding to the information of the type of said predetermined image forming means and the type of quantization processing method;
   means for, when a preview mode, in which image data for previewing an image formed by a predetermined image forming means is generated, is set, performing preview processing by using the profile read out by said reading means; and
   when an image forming mode is set, performing color matching by using the profile read out by said reading means,
   wherein the profiles each include a preview processing condition and a color matching condition which respectively correspond to information of a type of image forming means and a type of quantization processing method.

10. An image processing apparatus comprising:
    entering means for entering information of a processing condition and an output device type;
    reading means for reading out a profile in accordance with the processing condition and the output device type from storing means which stores a plurality of profiles each including gamut data and a color matching condition according to a processing condition and an output device type;
    judging means for judging whether or not input color image data is within a gamut according to the entered processing condition and the entered output device type, on the basis of the gamut data included in the profile; and notifying means for notifying a user when the input color image data is outside the gamut.

11. A storage medium which stores, in a computer readable state, a program for executing an image processing method, comprising the steps of:

entering information of a type of a predetermined image forming means and a type of quantization processing method for image formation;

reading out, from a storing means which stores plural profiles, a one of the profiles corresponding to the information of the type of the predetermined image forming means and the type of quantization processing method;

when a preview mode, in which image data for previewing an image formed by a predetermined image forming means is generated, is set, performing preview processing by using the profile read out in said reading-out step; and when an image forming mode is set, performing color matching by using the profile read out in said reading-out step, wherein the profiles each include a preview processing condition and a color matching condition which respectively correspond to information of a type of image forming means and a type of quantization processing method.

12. A storage medium which stores, in a computer readable state, a program for executing an image processing method comprising the steps of:

entering information of a processing condition and an output device type;

reading out a profile, in accordance with the processing condition and the output device type, from a storing means which stores a plurality of profiles each including gamut data and a color matching condition according to a processing condition and an output device type;

judging whether or not input color image data is within a gamut according to the entered processing condition and the entered output device type, on the basis of the gamut data included in the profile; and notifying a user when the input color image data is outside the gamut.

* * * * *

UNITED STATES PATENT AND TRADEMARK OFFICE
CERTIFICATE OF CORRECTION

PATENT NO.      : 6,108,008
DATED           : August 22, 2000
INVENTOR(S)     : Takatoshi Ohta It is certified that error appears in the above-identified patent and that said Letters Patent is hereby corrected as shown below:

<u>References Cited Item [56]</u>,
  FOREIGN PATENT DOCUMENTS

"57-056964  7/1981
    58-080085  11/1981"
should read
  -- 56-056964  7/1981
    56-080085  11/1981 --.

<u>Column 1</u>,
Line 17, "there is employed," should be deleted.

<u>Column 2</u>,
Line 59, "readout" should read -- read-out --.

<u>Column 10</u>,
Line 32, "utilized a" should read -- utilized as a --.

<u>Column 15</u>,
Line 14, "he" should read -- the --.

Signed and Sealed this

Thirteenth Day of November, 2001

Attest:

NICHOLAS P. GODICI
*Attesting Officer*  *Acting Director of the United States Patent and Trademark Office*